United States Patent [19]

Hays

[11] Patent Number: 4,886,090

[45] Date of Patent: Dec. 12, 1989

[54] APPARATUS FOR FAILSAFE METERING OF A FLUID

[75] Inventor: George F. Hays, Morristown, N.J.

[73] Assignee: Ashland Oil, Inc., Russell, Ky.

[21] Appl. No.: 277,282

[22] Filed: Nov. 29, 1988

Related U.S. Application Data

[63] Continuation-in-part of Ser. No. 42,467, Apr. 24, 1987.

[51] Int. Cl.⁴ .............................................. F16K 11/00
[52] U.S. Cl. ................... 137/624.11; 137/889; 137/607
[58] Field of Search ............... 137/5, 624.11, 624.18, 137/624.2, 888, 889, 606, 607; 222/442, 452

[56] References Cited

U.S. PATENT DOCUMENTS

| | | | |
|---|---|---|---|
| 868,023 | 10/1907 | Simpson | 222/442 X |
| 2,089,796 | 8/1937 | Hopf | 222/422 |
| 3,227,311 | 1/1966 | Rowell | 222/452 X |
| 3,454,027 | 7/1969 | Friedman | 222/442 X |
| 3,756,457 | 9/1973 | Holmes | 137/889 X |
| 3,857,409 | 12/1974 | Aubrey | 137/889 |
| 4,043,490 | 8/1977 | McKinney | 222/442 |
| 4,273,146 | 6/1981 | Johnson | 137/5 |

Primary Examiner—Alan Cohan
Attorney, Agent, or Firm—Louis E. Marn

[57] ABSTRACT

There is disclosed an assembly including a plurality of storage tanks for respective liquid chemicals to be metered, a plurality of feed chambers of a predetermined volume associated with respective storage tanks and disposed below such respective storage tanks, a conduit for process fluid for receiving predetermined volumes of such liquid chemicals as predetermined time cycles wherein the liquid chemicals are introduced in parallel feed to the process fluid in response to respective cycle timers.

12 Claims, 2 Drawing Sheets

APPARATUS FOR FAILSAFE METERING OF A FLUID

BACKGROUND OF THE INVENTION (1) Related Application

This is a continuation-in-part of U.S. patent application Ser. No. 07/042,467, filed Apr. 24, 1987 (pending).

(2) Field of the Invention

This invention relates to an apparatus for handling fluids, and more particularly to an improved apparatus for metering a plurality of liquid chemical additives into a liquid process stream.

(3) Description of the Prior Art

An important unit process in the chemical industry is admixing or introduction of one chemical in another chemical, particularly the introduction of a small quantity of one liquid chemical into a substantially larger quantity of the other liquid chemical under control conditions to achieve a desired result without the necessity of constant monitoring for an upset condition. Generally, any upset condition leads to deleterious results including explosions, lengthy shutdowns, and the like. Generally, there are two methods for metering such small amounts of a chemical into another chemical under controlled conditions. One method includes the use of a metering pump; the other method includes gravity feed.

Use of a metering pump suggests a system with inherent failure problems as a result of materials of construction of the pump which are subject to wear, chemical attack, and the like. Failure of a metering pump may take place in the form of an overfeed or an underfeed.

Gravity feed systems include the use of metering valves as well as a solenoid valve and timer assemblies. Metering valves may be subject to plugging by minute quantities of solids in the solution feed being metered resulting in an underfeed condition and thus inaccurate feed rates to effect processing. A solenoid valve may fail in an open position resulting in a substantial overfeed condition or inaccurate feed as a result of fluctuating line voltage, or may fail in the closed position resulting in substantial underfeed.

In the above mentioned copending application, there is disclosed an assembly including a storage tank for a liquid to be metered, a feed tank of a predetermined volume disposed below the storage tank, and a processing unit for receiving said predetermined volume of liquid within a predetermined time cycle wherein the processing unit is disposed below the feed tank and wherein there is provided a valve assembly having three ports, each of which is connected by a conduit to the storage tank, the feed tank, and the processing tank, respectively, and wherein the valve assembly is provided with a valve controller having an internal chamber configuration wherein a first position of the valve controller provides fluid communication between the port connected to the storage tank and the port connected to the feed tank and in a second position provides fluid communication between the port connected to the feed tank and the port connected to the processing unit wherein the valve controller is caused to cycle between the first position and the second position in response to a timer.

OBJECTS OF THE INVENTION

An object of the present invention is to provide an improved apparatus for metering a plurality of fluids into a liquid process stream.

Another object of the present invention is to provide an improved pumpless apparatus for failsafe metering a plurality of fluids into a liquid process stream.

Still another object of the present invention is to provide an improved apparatus for metering a plurality of fluids into an aqueous process stream.

A further object of the present invention is to provide an improved apparatus for metering a plurality of fluids into an aqueous process stream guaranteeing total isolation between the solution supply tank and the fluid stream thereby preventing premature mixing of one solution with another solution.

A still further object of the present invention is to provide an improved apparatus for metering a plurality of fluids into an aqueous process stream assuring consistent dosage of each fluid in each feed cycle.

SUMMARY OF THE INVENTION

These and other objects of the present invention are achieved by an assembly including a plurality of storage tanks for respective liquid chemicals to be metered, a plurality of feed chambers of a predetermined volume associated with respective storage tanks and disposed below such respective storage tanks, a conduit for process fluid for receiving predetermined volumes of such liquid chemicals at predetermined time cycles wherein the liquid chemicals are introduced in parallel feed to the process fluid in response to respective cycle timers.

BRIEF DESCRIPTION OF THE DRAWINGS

A better understanding of the present invention as well as other objects and advantages thereof will become apparent upon consideration of the detailed disclosure thereof, especially when taken with the accompanying drawings, wherein.

DETAILED DESCRIPTION OF THE INVENTION

Figure 1:
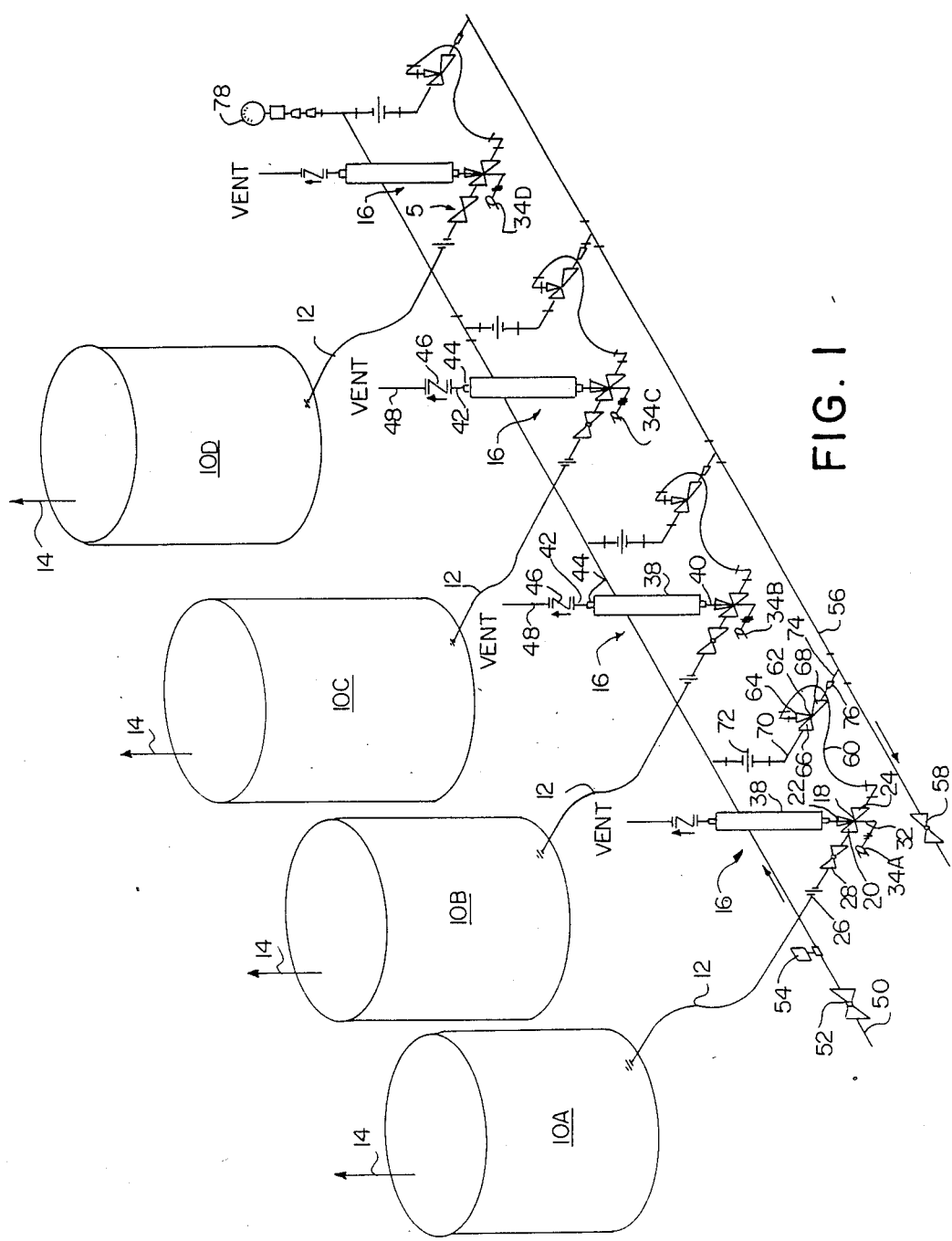
FIG. 1 is a schematic flow diagram of the apparatus of the present invention.

It is to be understood that equipment, such as passages, valves, indicators, and the like have been omitted from the drawings to facilitate the description thereof and the placing of such equipment at appropriate places is deemed to be within the scope of those skilled in the art.

Referring now to the drawing, there is illustrated a plurality of storage tanks 10A to 10D having an outlet conduit 12 and a vent conduit 14. The vent conduit 14 is connected to atmosphere. The outlet conduit 12 of each storage tank 10 is connected to a metering assembly, generally indicated as 16, including valve assembly 18 having ports 20, 22 and 24 with the outlet conduit 12 of each storage tank 10 connected via an orifice 26 and under the control of a valve 28 to the port 20 of the valve assembly 18. The valve assembly 18 is provided with a rotary valve controller (not shown) such as described in the aforementioned copending U.S. application, incorporated herein by reference, is connected via a shaft 32 to a motor 34 under the control of a timer-36. In a first position of the rotary valve controller of the valve assembly 18, port 20 is in fluid communication with port 22 and in second position the port 22 is in fluid communication with the port 24, as more fully hereinafter disclosed.

The metering assembly 16 of the present invention includes a metering column or chamber 38 of a predetermined volume with respect to respective storage tanks 10A–10D as a function of the liquid chemicals stored therein. The metering column 38 is connected to a lower conduit 40 and an upper conduit 42. The respective storage tanks 10 are disposed above respective metering columns 38 at a height of at least one foot above the top of metering column 38. Each metering column 38 includes a liquid sensor 44 in fluid communication with the conduit 42 provided with a one way valve 46 with a vent unit 48 with the lower conduit 40 being in fluid communication with the port 22 of the valve assembly 18.

The process fluid to be treated or to which chemicals are to be metered under a predetermined program is passed in a conduit 50 under the control of shut-off valve 52 including a flow control switch 54 under the control of a controller assembly, as hereinafter more clearly described. The process fluid is passed in parallel flow relationship to each metering assembly 16 in fluid flow communication with a downstream conduit 56 under the control of a valve 58 and thence to a process unit (not shown), such as a cooling tower.

Each metering unit assembly 16 is in fluid communication via a conduit 60 with an eductor assembly 62 including an eductor port 64, an inlet port 66 and a discharge port 68. The inlet port 66 is in fluid communication via a conduit 70 including a flow restriction member 72 with the process fluid conduit 50. The discharge port 68 of the eductor assembly 62 is in fluid communication via a conduit 74 including a one way valve 76 with the downstream process fluid conduit 56. A pressure relief assembly 78 is provided in fluid communication with the conduit 50.

Figure 2:
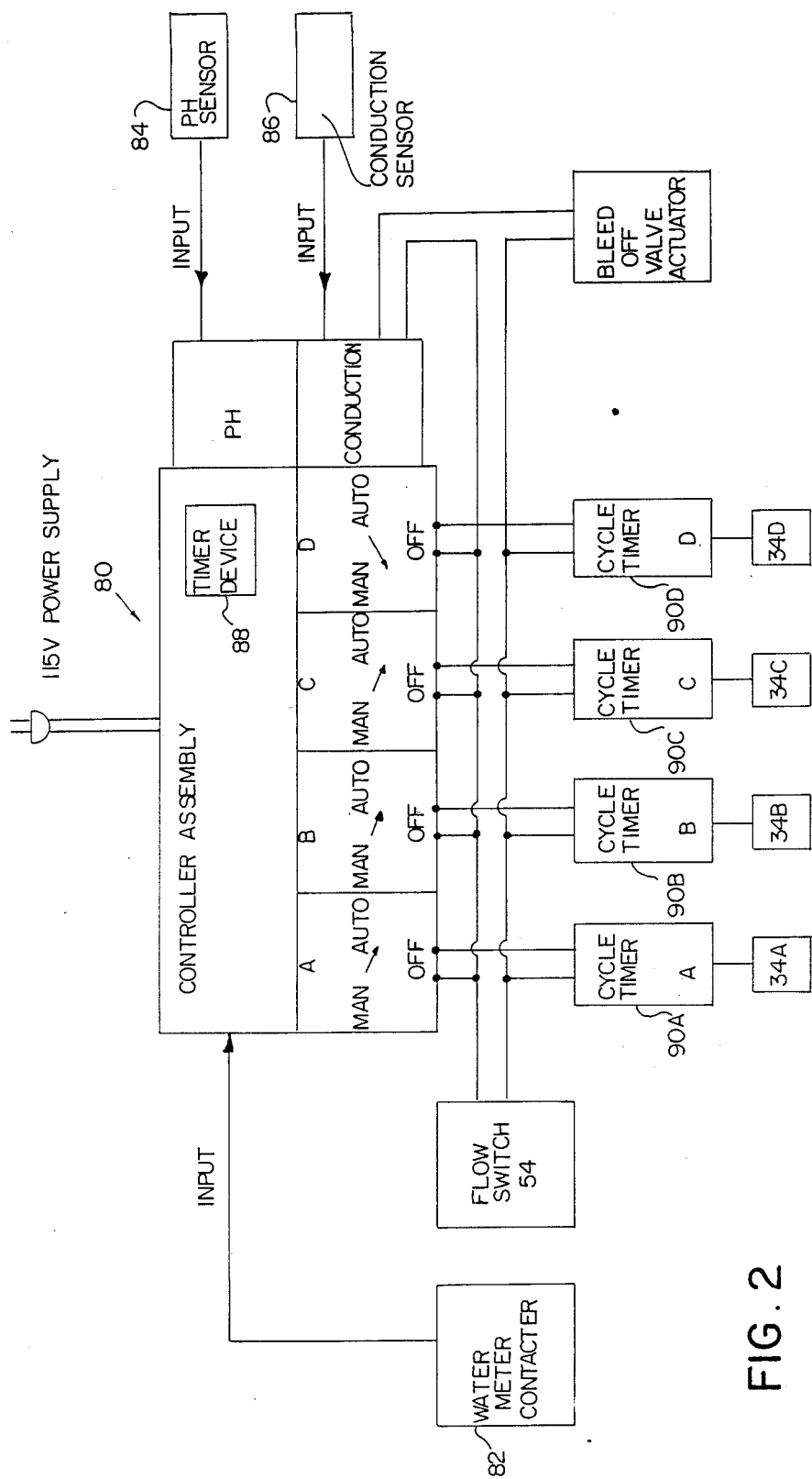
FIG. 2 is a schematic drawing of the controller assembly for the apparatus of FIG. 1.

The controller assembly, generally indicated as 80, referring to FIG. 2 is comprised of a programmable logic controller (PLC) capable of receiving imput signals from external devices, such as water meter contact closure 82, a pH monitor 84, a conductivity monitor 86, interval clock 88, external clock (not shown), distribute. One or more signals are used to control the cycle frequency for each cycle time 90A, 90B, 90C, and 90D of each feed assembly 16. To prevent addition of a fluid to a stagnant line, flow switch 54 is used to interrupt the signal between the controller and the cycle timer 90A to 90D. The controller also provides a record of fluid consumed in the process. The logic controller is provided with lockout logic to prevent simultaneous feeding of two or more liquids, as well as to turn off the "blowdown" at a time when a microbiocide is being added to the water system.

The logic controller permits independent feed of the liquids based, inter alia, on time (time of day or elapsed time); on a quantity of process fluid passed through the system; as a function of the offset of pH from a set point; as a function of conductivity of stream versus a conductivity set point, or a combination of the preceding. Additionally, as understood by one skilled in the art, other imput data, such as corrosion rates, total organic carbon, turbidity or fouling factors may be used as one or more of potential imput signals to determine dosage regimen of one or more fluids.

The cycle timer assembly 90A–90D for each metering assembly 16 is set to activate each motor to its first position to allow sufficient time to fill each respective metering columns 38. Each of the motors 34A–34D is biased to return the valve controller thereof to an initial or second position upon power failure. An interlock is provided to control the cycle timer assemblies 90A to 90D to prevent simultaneous operation of more than one metering assembly 16, as hereinafter discussed.

As readily appreciated by one skilled in the art, the metering columns 38 may be readily changed to diverse volumeric sizes to provide the means at constant cycling times to vary the flow rate of the respective fluid additives to be metered into the process fluid. Thus, metering rates may be conveniently changed by altering the size of the metering columns 38 rather than altering the operating characteristics of the timer assemblies 36 although frequency of cycling may also be readily modified. Alternately, the volumetric size may be the same for all feeder assemblies and the frequency of feed cycling may be increased or decreased to vary the fluid feed rate over a day or week.

In operation, for example, in treating water for a cooling water system to inhibit fouling and corrosion, the chemical requirements are 4 gallons per day of corrosion inhibitor (tank 10A); 2.5 gallons per day of antifoulant (tank 10B); 6 gallons per day of concentrated sulfuric acid (tank 10C) and 8 gallons per 10 days of microbioside. With such requirements, a one quart metering column 38 is provided for storage tanks 10A and 10B; one pint metering column 38 for tank 10C and one gallon metering column 38 for tank 10D. Consequently, the associated valve assemblies 18 for the metering assemblies 16 are cycled once every 90 minutes, 144 minutes, 90 minutes and 8 cycles per 20 minutes one out of 10 days, respectively. The process water is continuously passed through the conduit 52 in parallelled flow through the eductor assemblies 62 and thence into and through the conduit 56.

As hereinbefore mentioned, the associated timers 36 are cycled in a manner to activate the valve controller of each valve assembly 18 to effect a port 20 to port 22 relationship to permit filling of respective metering columns 38 which are filled by gravity until the liquid closes the valve 46 and the sensor 44 energizes the motor 34 to return the valve controller to a port 22 to port 24 relationship permitting fluid flow to conduit 56 under the effect of reduced pressure provided by the eductor assembly 62 via conduits 60 and 74.

An important aspect of the present invention is the ability to readily clean or rinse the respective metering columns 38 by closing the valve 58 for short periods of time to permit process water to flow into the metering columns 38 from conduit 50 through the eductor assembly 62 via the eductor port 64 and conduit 60 and then through a port 24 to port 22 relationship of the valve assembly 18. Once the metering columns 38 have been filled, the valve 58 is opened to permit withdrawal of the rinse fluid from the metering columns. Such rinsing protocol may be repeated several times to ensure effective rinsing of the metering columns 38.

In accordance with the present invention, any apparatus failure prevents any flow of liquids from the storage tanks 10A to 10D to the metering columns 38 since failure would not provide any fluid communication between the storage tanks 10A–10D with respective metering columns 38. It will be fully appreciated by one skilled in the art that the apparatus of the present invention is practiced without the aid of a pump, i.e. totally by gravity flow or feed.

While the present invention has been described in connection with an exemplary embodiment thereof, it will be understood that many modifications will be apparent to one of ordinary skill in the art, and that this application is intended to cover any adaptation or variations thereof. Therefore, it is manifestly intended that this invention be only limited by the claims and the equivalents thereof.

What is claimed:

1. An assembly for introducing a predetermined volume of a plurality of liquids into a process fluid at a predetermined time cycle without the aid of a pump, which comprises;

a plurality of storage tanks for said liquids;

a metering chamber of predetermined volume associated with a respective storage tank, said metering chamber being vertically disposed below said storage tank;

an inlet conduit from a process unit for said process fluid;

an outlet conduit for returning process fluid to said process unit;

an eductor assembly associated with each metering chamber;

conduit means in fluid communication with said conduits and said eductor assembly associated with each metering chamber;

valve assembly means associated with each metering chamber having three ports for providing fluid flow between a first port and a second port of said valve assembly in a first position and for providing fluid flow between said second port and a third port of said valve assembly in a second position thereof;

first conduit means for providing fluid communication between a respective one of said plurality of storage tanks and a first port of said valve assembly;

second conduit means for providing fluid communication between a second port of said valve assembly and said metering chamber;

third conduit means for providing fluid communication between a third port of said valve assembly means and said eductor assembly; and timer means for placing said valve assembly in said first position from said second position.

2. The assembly as defined in claim 1 wherein said timer means includes a motor assembly for a valve assembly means associated with each metering chamber.

3. The assembly as defined in claim 1 wherein said conduit means associated with each eductor assembly includes a restrictive orifice.

4. The assembly as defined in claim I wherein said conduit means includes a valve for selectively placing a metering chamber in operative relationship to said inlet conduit for said process fluid.

5. The assembly as defined in claim 1 wherein said outlet conduit includes a valve means for closing fluid flow therethrough thereby effecting fluid flow into respective metering chambers via said eductor assembly.

6. The assembly as defined in claim 2 wherein said valve assembly means is biased in said second position.

7. The assembly as defined in claim 1 and further including a controller assembly means for controlling each of said timer means.

8. The assembly as defined in claim 7 wherein said controller assembly means is responsive to a pH sensor.

9. The assembly as defined in claim 7 wherein said controller assembly means is responsive to a conductivity sensor.

10. The assembly as defined in claim 8 wherein said controller assembly means includes a lockout means to prevent simultaneous activation of more than one timer means.

11. The assembly as defined in claim 8 wherein said controller assembly means controls a valve in said outlet conduit for closing fluid flow therethrough thereby effecting fluid flow into respective metering chambers via said eductor assembly.

12. The assembly as defined in claim 11 wherein said controller assembly means is provided with means for preventing closing of said valve should one of said metering chambers include a microbiocide being ejected into said process fluid.

* * * * *